United States Patent [19]

Kinoshita

[11] 4,202,659
[45] May 13, 1980

[54] DEVICE FOR CHANGING A WIRE NETTING IN A FILTER DEVICE FOR SYNTHETIC RESINS

[75] Inventor: Tomoo Kinoshita, Tokyo, Japan
[73] Assignee: Nihon Repro Machine Kogyo Kabushiki Kaisha, Tokyo, Japan
[21] Appl. No.: 876,143
[22] Filed: Feb. 8, 1978
[30] Foreign Application Priority Data Mar. 15, 1977 [JP] Japan .................................. 52/27589

[51] Int. Cl.² .............................................. B29F 3/00
[52] U.S. Cl. ........................ 425/183; 210/DIG. 15; 425/185; 425/192 R; 425/199; 425/461
[58] Field of Search ............... 210/232, DIG. 15, 498, 210/499, 435, 359, 297, 314, 340, 341; 366/87; 425/183, 185, 190, 191, 192 R, 197, 198, 199, 376 R, 376 A, 461; 137/599.1

[56] References Cited

U.S. PATENT DOCUMENTS

| 2,070,395 | 2/1937 | Easter | 210/340 X |
| 3,059,276 | 10/1962 | Yokana | 425/185 |
| 3,951,802 | 4/1976 | Derovineau | 137/599.1 X |
| 4,070,138 | 1/1978 | Stanwood | 425/185 X |

FOREIGN PATENT DOCUMENTS 131875  6/1962 Fed. Rep. of Germany ........... 425/199

*Primary Examiner*—Mark Rosenbaum
*Attorney, Agent, or Firm*—Oblon, Fisher, Spivak, McClelland & Maier

[57] ABSTRACT

A device for changing a wire netting in a filter device for synthetic resins comprising a die body fixed in contact with an extruding port of an extruding machine, the die body having a first hole for change drilled therein, a guide inlet communicating with the first hole for change and an extruding port, a pair of second holes for screening drilled in the die body respectively at both sides of the hole for change, a pair of guiding pipes respectively communicating with the pair of second holes for screening, a pair of exhaust guide ways respectively communicating with the pair of second holes, a pair of valve guide ways respectively having a larger diameter than those of the pair of exhaust guide ways and respectively communicating with the pair of exhaust guide ways and an exhaust port, one end of which is opened and the other end of which communicates with the center and connecting portion of the pair of valve guide ways, a valve for changing flow which has a guide opening through which the guide inlet communicates with one of the pair of guide pipes, the valve for changing flow being inserted into the hole for change free to rotate therein, a cylinder strainer surrounded by a wire netting respectively inserted into the pair of second holes for screening and a choke valve inserted into the pair of valve guide ways free to slide therein.

2 Claims, 5 Drawing Figures

DEVICE FOR CHANGING A WIRE NETTING IN A FILTER DEVICE FOR SYNTHETIC RESINS

BACKGROUND OF THE INVENTION

The present invention relates to a device for changing a wire netting in a filter device for synthetic resins.

When synthetic resins are melted and extruded from an extruding machine, a breaker plate is used to exclude impurities in the raw materials. The breaker plate has a plurality of small openings and is equipped with a circular wire netting on the surface thereof facing the extruding port of the extruding machine. The melted synthetic resins are screened through the wire netting and the impurities can be excluded. However, the breaker plate is set in a die body. Therefore, when the wire netting must be changed, the extruding machine operation must be stopped and the die body must be opened, after which the wire netting can be changed. Therefore, it has been very troublesome to change a used wire netting to a new wire netting.

To avoid the above described trouble, a screen change device was provided which can change the screen during extrusion as is disclosed in Japanese Patent Publication No. 4179 of 1973. The screen change device is composed of a screen carrier and a fixed body around which the screen carrier can rotate in contact therewith. However, in this screen device, a plurality of screen carriers must be rotated by means of hydraulic mechanism and it becomes necessary to equip the screen device with another driving motor than the motor that drives the extruding machine. Therefore, a large floor to support the other motor and the extruding machine becomes necessary. Besides, it was necessary to change an opening for an inlet and an opening for an outlet respectively at the same time when the plurality of screen carriers are changed. Accordingly, the mechanism of the screen device becomes very complex. From this complexity many defects arise.

SUMMARY OF THE INVENTION

Accordingly, an object of the present invention is to provide a device for changing a wire netting screen in a filter device of synthetic resins that can easily change a wire netting during the operation of the extruding machine by means of a change of the inlet of two strainers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
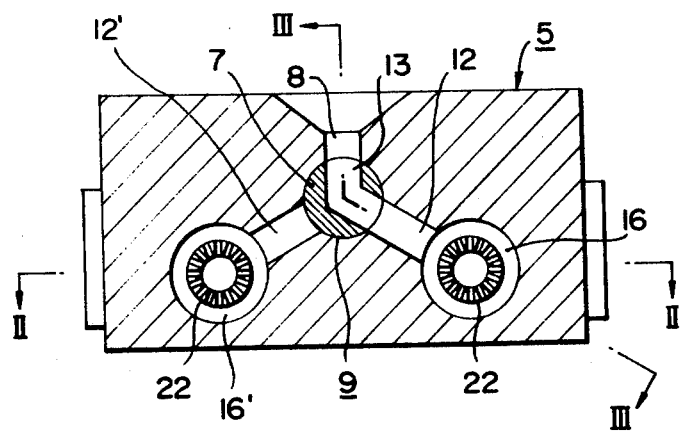
FIG. 1 is a lateral sectional plane view of one preferred embodiment of wire netting changing device of the present invention.

Referring now to the drawings, wherein like reference numerals designate identical or corresponding parts throughout the several views, and more particularly to FIG. 1 thereof, a die body 5 is fixed in contact with an exhaust port 4 of an extruding machine 3 having a screw 2 set laterally and free to rotate in a cylinder 1 thereof. In this die body 5 is drilled a hole 7 for change having a bottom and a circular cross-sectional area and has formed horizontally a guide inlet 8 by which the exhaust port 4 can communicate with the hole 7 for change. Further, into the hole 7 for change is inserted a valve 9 for changing flow having a circular cross-sectional area. On the upper portion of the valve 9 for changing flow is formed a stage portion 11 to make an operation bar 10 with a smaller diameter than that of the valve 9 for changing flow, and in the downward portion of the valve 9 for changing flow is opened therethrough a guide opening 13 which communicates with a guide passages 12 and a guide passage 12 respectively and is bent with such an angle as 120° like the shape of the letter "V". Further, into the hole 7 for change, a pressing cylinder 15 is inserted having a flange 14 fixed on the upper wall 6 of the die body 5. The under edge of the pressing cylinder 15 is in contact with the stage portion 11 of the valve 9 for changing flow, which is made to rotate without vertical movement at any time.

Further, to the opposite side of the guide inlet 8 in the die body 5, are drilled parallelly to the hole 7 for change, a pair of holes 16, 16' for screening the hole 7 for change and the axes of the two holes 16, 16' forming an angle of 120°. The hole 7 for change becomes a center of the pair of holes 16, 16'. The respective upper end of the pair of holes 16, 16' for screen is opened. The inner surface of the opening thereof is respectively threaded to form a screw portion 17. The bottom ends of the holes 16, 16' have respectively bottoms on which are drilled exhaust ports 19, 19' respectively communicating with a through opening 18. The pair of guiding passages 12, 12' are set at the same height as the guide inlet 8 so that the guide opening 13 can communicate with the guide inlet 8 and the guideing pipe 12 or 12' at the same time respectively. Then, the guide inlet 8, the guide opening 13 and the guiding passage 12 are in communication with the hole 16 for screening as shown in FIG. 1.

Into the pair of holes 16, 16' for screening is respectively inserted a cylindrical strainer 22, comprising a hollow cylinder 20 for screening, opened at the bottom end thereof and a plurality of screen openings 21 communicating with the hollow cylinder 20. A male screw portion 23 made on the upper portion of said cylindrical strainer 22 is screwed to the female screw portion 17. Further, around the outer surface of the plurality of screen openings 21 of the cylindrical strainer 22 is disposed a wire netting 24.

Connecting blocks 25, 25' are inserted into the through opening 18 from the left side and from the right side thereof respectively. Both connecting blocks 25, 25' are in contact at the center of the through opening 18 and are respectively fixed on the side wall of the die body 5 by the flanges 26, 26' formed respectively at one of the two ends of the blocks 25, 25'. In the blocks 25, 25' are respectively formed exhaust guide ways 27, 27' with the shape of the letter "L". In the center side portion of both exhaust guide ways 27, 27' are respectively formed valve slide ways 28, 28' in which a choke valve 29 of the free piston type is inserted. At the center portion of the bottom surface of the valve sliding ways 28, 28' are respectively formed longitudinal clearance seats 30, 30' like key ways which respectively communicate with the through opening 18.

Further, in the bottom portion of the die body 5 is drilled an exhaust port 31, one end of which communicates respectively with valve sliding ways 28, 28' and longitudinal clearance seats 30, 30' like key ways.

As the preferred embodiment of the present invention is composed as described above, the melted synthetic resins which are exhaused from the exhaust port 4 of the extruding machine 3 are guided into the hole 16 for screening from the one guiding passage 12 after passing the guide opening 13 in the valve 9 for changing flow, are filtered by the wire netting 24 around the cylindrical strainer 22, are purified by excluding impurities by the wire netting 25 to pass through the plurality of screen openings 21 into the hollow cylinder 20, and are exhausted into a die, the figure of which is abbreviated, from the exhaust port 31 after passing the valve sliding ways 28, and the exhaust guide ways 27 through the exhaust port 19.

Figure 2:
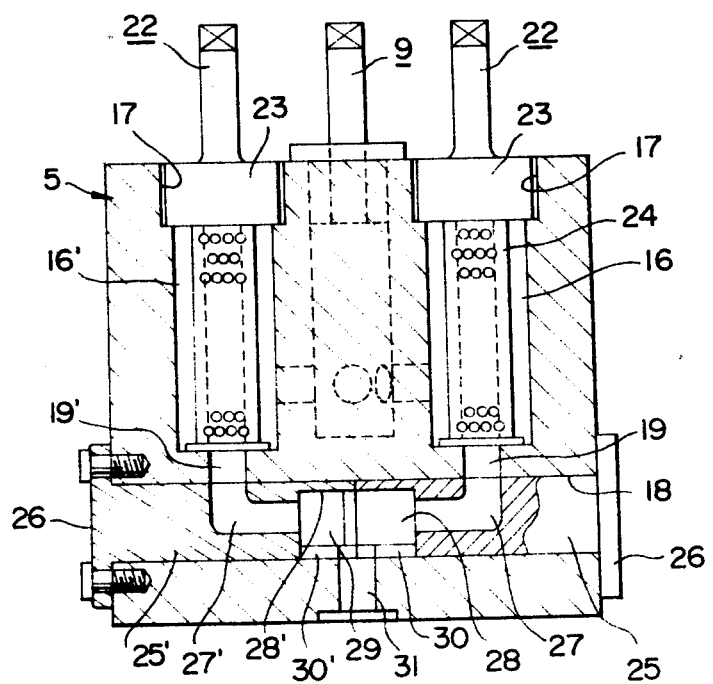
FIG. 2 is a sectional view cut along the line II-II of FIG. 1.
Figure 3:
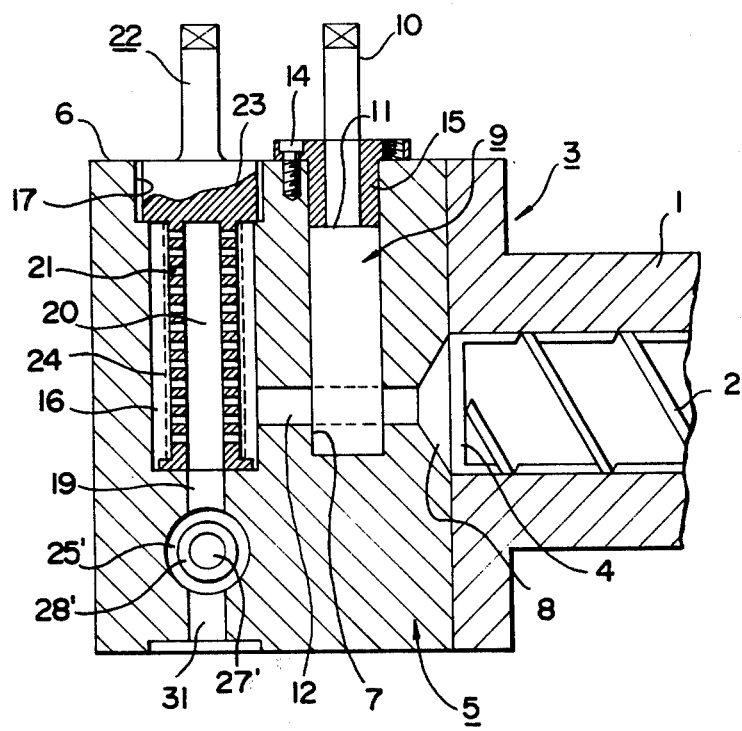
FIG. 3 is a sectional view cut along the line III-III of FIG. 1 showing a cylinder inserted therein.
Figure 4:
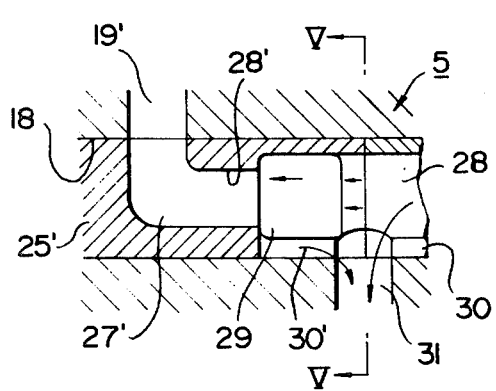
FIG. 4 is an enlarged longitudinal sectional view of the guide way portion of the choke valve 29.
Figure 5:
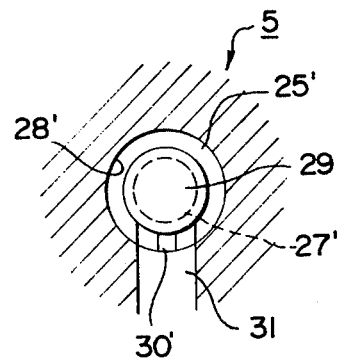
FIG. 5 is a sectional view cut along the V-V line of FIG. 4.

After usage of the cylindrical strainer 22 for a predetermined time interval and the quantity of the impurities adhered to the wire netting is increased, the valve 9 for changing flow is turned by manual operation to the counter-clockwise direction in the FIG. 1. Then, the guide inlet 8 communicates with the guiding passage 12' by the action of the guide opening 13 which at the same time shuts the way to the guiding passage 12. In this way, the melted synthetic resins are guided into the hole 16' for screening positioned at the portion opposite to the hole 16 for screening and are guided into the exhaust guide way 27' from the exhaust port 19 after being filtered by the wire netting 24 as described above. After passing the hollow cylinder 20 of the cylindrical strainer 22, the resins push the choke valve 29 by the hydraulic pressure thereof to move it to the right hand side as shown in FIG. 2, and to shut the exhaust guide way 27 which is positioned opposite to said exhaust guide way 27' are exhausted from the exhaust port 31 through the valve sliding way 28'. Further, when the choke valve 29 moves to the right hand side, the melted synthetic resins that remain in the valve guide way 28 and in the exhaust guide way 27 are guided to the exhaust port 31 through the longitudinal clearance seat 30, whereby the movement of the choke valve 29 becomes very smooth.

During the usage of said hole 16' for screening, the other hole 16 for screening is deprived of the cylindrical strainer 22 therein and the wire netting therearound is changed, and then the cylindrical strainer 22 with a new wire netting 24 is inserted into the hole 16 for screening.

Now, in the above described embodiment, the through opening 18 is drilled in the die body 5 and connecting blocks 25, 25' are respectively inserted from one side and from the other side of the through opening 18. In these connecting blocks 25, 25' are respectively formed the exhaust guide ways 27, 27' and the pair of valve guide ways 28, 28'. However, this explanation is based on the benefit concerning execution of work. Therefore, there may be another composition with respect to the exhaust guide ways 27, 27' and the valve guide ways 28, 28'. The object of the function of the bottom portion of the die body 5 is that there must be formed the exhaust guide ways 27, 27' and the valve guide ways 28, 28' in the die body 5.

Further, the longitudinal clearance seats 30, 30' like keyways are formed for the choke valve 29 to move smoothly. Therefore, if the longitudinal clearance seats 30, 30' are not formed, the choke valve 29 can move.

Further, it is described above that both holes 16, 16' for screening are formed at an angle of 120° with the hole 7 for change at the center. However, the angle of 120° is determined by the fact that the guide opening 13 is formed in the shape of a "V" with an angle of 120° and makes the guide inlet 8 communicate with precisely the pair of guiding passages 12, 12'. Therefore, the angle of the divergency of the holes 16, 16' for screening with respect to the hole 7 for change is not limited to 120' and various angles may be used.

As the present invention has such composition and function as shown in the above described embodiment, simplicity of composition could be achieved, for example, the valve 9 for changing flow only changes the pair of guiding passages 12, 12' which are respectively the inlet sides of the hole 16, 16' for screening. Therefore, it is very simple to operate the device for changing a wire netting screen in a filter device for synthetic resins according to the present invention.

Besides, it is not necessary to pay attention to the position relation between the valve 9 for changing flow and the exhaust guide ways 27, 27' which are respectively the exhaust sides of both holes 16, 16' for screening, the position of which can be selected independently of the position of the exhaust guide ways 27, 27'. Therefore, the execution of work of the device according to the present invention is very simple.

Further, one of the sides of the exhaust guide ways 27, 27' can be shut without fail by the choke valve 29 which automatically moves by the flow of the melted synthetic resins, which do not flow into the opposite hole for screening and are exhausted from the exhaust port 31 without fail.

Further, as the valve 9 for changing flow can be operated with ease, no special mechanical equipment is necessary and the change of the wire netting 24 can be achieved without stopping the extrusion work of the melted synthetic resins.

Obviously, numerous additional modifications and variations of the present invention are possible inlight of the above teachings. It is therefore to be understood that within the scope of the appended claims, the invention may be practiced otherwise than as specifically described herein.

What is claimed as new and desired to be secured by letters patent of the United States is:

1. A device for changing a wire netting in a filter device for synthetic resins comprising a die body fixed in contact with an exhaust port of an extruding machine, said die body having a first hole for change drilled therein, a guide inlet communicating with said first hole for change and said exhaust port, a pair of second holes for screening drilled in said die body respectively at both sides of said hole for change, a pair of guiding passages respectively communicating with said pair of second holes for screening, a pair of exhaust guide ways respectively communicating with said pair of second holes, a pair of valve sliding ways respectively having a larger diameter than those of said pair of exhaust guide ways and respectively communicating with said pair of exhaust guide ways and an exhaust port one end of which is opened and the other end of which communicates with a center and connecting portion of said pair of valve sliding ways, a valve for changing flow which has a guide opening through which said guide inlet communicates with one of said pair of guide passages, said valve for changing flow being inserted into the hole for change and free to rotate therein, a cylinder strainer surrounded by a wire netting respectively inserted into said pair of second holes for screening, and a choke valve, movable in response to the movement of said valve for changing flow, inserted into the pair of valve sliding ways and free to slide therein wherein each of said valve sliding ways includes a longitudinal clearance seat for guiding resins from one of said valve sliding ways into said exhaust port when said choke valve enters said one of said valve sliding ways.

2. A device for changing a wire netting in a filter device for synthetic resins comprising:

a die body fixed in contact with an exhaust port of an extruding machine, said die body including a first hole for change, a guide inlet means communicating said first hole for change with said exhaust port, a pair of second holes for screening located in said die body, a pair of guiding passages communicating said second holes for screening with said first hole for change, a pair of exhaust guide ways respectively communicating with said pair of second holes, a pair of valve sliding ways respectively communicating with said pair of exhaust guide ways, an exhaust port connecting said valve sliding ways, a valve for changing flow located in said first hole for change and freely rotatable therein, a cylinder strainer surrounded by a wire netting respectively inserted into each of said pair of second holes for screening, and a choke valve movable in response to the movement of said valve for changing flow, freely slidable within said pair of valve guide ways, wherein each of said valve sliding ways includes a longitudinal clearance seat for guiding resins from one of said valve sliding ways into said exhaust port when said choke valve enters said one of said valve sliding ways.

* * * * *